United States Patent
Venkataramana et al.

(10) Patent No.: US 11,600,185 B2
(45) Date of Patent: Mar. 7, 2023

(54) SYSTEMS AND METHODS FOR FLIGHT PLANNING FOR CONDUCTING SURVEYS BY AUTONOMOUS AERIAL VEHICLES

(71) Applicant: HONEYWELL INTERNATIONAL INC., Morris Plains, NJ (US)

(72) Inventors: Kiran Venkataramana, Bangalore (IN); Mohan Chandrashekarappa, Hyderabad (IN); Sridevi Nagaraja, Bangalore (IN); Babitha Jajur, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 261 days.

(21) Appl. No.: 16/905,191

(22) Filed: Jun. 18, 2020

(65) Prior Publication Data
US 2021/0343160 A1 Nov. 4, 2021

(30) Foreign Application Priority Data
May 1, 2020 (IN) .............................. 202011018687

(51) Int. Cl.
*G08G 5/00* (2006.01)
*B64C 39/02* (2006.01)

(52) U.S. Cl.
CPC .......... *G08G 5/0034* (2013.01); *B64C 39/024* (2013.01); *G08G 5/006* (2013.01);
(Continued)

(58) Field of Classification Search
CPC .................................................. G08G 5/0034
See application file for complete search history.

(56) References Cited

U.S. PATENT DOCUMENTS 8,543,265 B2   9/2013  Ekhaguere et al.
9,275,645 B2 *  3/2016  Hearing .................. G10L 25/18
(Continued)

FOREIGN PATENT DOCUMENTS

CN   110764433 A  *  2/2020  ............. G05B 17/02
EP     3251108 A1  * 12/2017  ........... B64C 39/024
(Continued)

OTHER PUBLICATIONS

Cimino, Mario, G, et al., Combining stigmergic and flocking behaviors to coordinate swarms of drones performing target search, 2015 6th International Conference on Information, Intelligence, System and Applications (IISA) (IEEE Xplore, https://ieeexplore.ieee.org/abstract/document/7387990 (Jul. 6, 2015).*

(Continued)

*Primary Examiner* — Jean Paul Cass
(74) *Attorney, Agent, or Firm* — Lorenz & Kopf, LLP

(57) ABSTRACT

The present disclosure provides systems and methods for flight planning for an autonomous aerial vehicle. The systems and methods perform a processor executed process of receiving a request for flight planning and retrieving a model for the structure or the feature of interest from one or more databases. The request identifies a structure or a feature of interest to be surveyed by the autonomous aerial vehicle. The one or more databases include a database including models of terrain, airports and obstacles or a database including models of manufactured articles based on original equipment manufacturer (OEM) specifications or computer aided design (CAD) models. The process includes computing a flight plan that completely surveys the structure or completely surveys the feature of interest based on the retrieved model. The flight plan defines a search pattern with position values. The process includes uplinking the flight plan to the autonomous aerial vehicle.

9 Claims, 5 Drawing Sheets

(52) U.S. Cl.
CPC ......... *G08G 5/0069* (2013.01); *G08G 5/0086* (2013.01); *B64C 2201/123* (2013.01); *B64C 2201/145* (2013.01); *B64C 2201/146* (2013.01)

(56) References Cited

U.S. PATENT DOCUMENTS

| | | | |
|---|---|---|---|
| 9,618,934 | B2 | 4/2017 | Deroos et al. |
| 10,372,122 | B2 | 8/2019 | Zach |
| 10,509,417 | B2 | 12/2019 | van Cruyningen |
| 2009/0210109 | A1 | 8/2009 | Ravenscroft |
| 2016/0253808 | A1 | 9/2016 | Metzler et al. |
| 2016/0307447 | A1 | 10/2016 | Johnson et al. |
| 2017/0046873 | A1 | 2/2017 | Terry et al. |
| 2017/0206414 | A1 | 7/2017 | Schultz et al. |
| 2017/0206648 | A1* | 7/2017 | Marra ................ G01C 11/00 |
| 2020/0401138 | A1* | 12/2020 | Rentz ................. G05D 1/104 |
| 2021/0304625 | A1* | 9/2021 | Ali ..................... G08G 5/0026 |
| 2021/0350713 | A1* | 11/2021 | Van Meeteren ........ H04W 4/40 |

FOREIGN PATENT DOCUMENTS

| | | | | |
|---|---|---|---|---|
| TW | | I687111 B | * 12/2016 | |
| WO | WO-2017099568 | A1 | * 6/2017 | |
| WO | WO-2018103407 | A1 | * 6/2018 | ........... B64C 39/024 |

OTHER PUBLICATIONS

Machine translation of TWI687111B (Apr. 4, 2022).*
Google Machine Translation of International Patent Pub. No. WO2017099568A1 to Sanchez filed in 2015 (Year: 2015).*
Besada, Juan A., "Drone Mission Definition and Implementation for Automated Infrastructure Inspection Using Airborne Sensors," Sensors Apr. 11, 2018, 18, 1170; doi:10.3390/s18041170, www.mdipt.com/journal/sensors.
Search and Rescue Optimal Planning System—Wikipedia downloaded from: https://en.wikipedia.org/wiki/Search_and_Rescue_Optimal_Planning_System) on Jun. 18, 2020.

* cited by examiner

SYSTEMS AND METHODS FOR FLIGHT PLANNING FOR CONDUCTING SURVEYS BY AUTONOMOUS AERIAL VEHICLES

CROSS REFERENCE TO RELATED APPLICATION

This application claims priority to Indian Provisional Patent Application No. 202011018687, filed May 1, 2020, the entire content of which is incorporated by reference herein.

TECHNICAL FIELD

The present disclosure generally relates to systems and methods for flight planning for conducting surveys by autonomous aerial vehicles. More particularly, the systems and methods described herein provide for remote flight planning for autonomous aerial vehicles for special missions including surveying a structure or a feature of interest.

BACKGROUND

An optimal flight plan is key for the successful execution of any mission performed by an autonomous aerial vehicle. An optimal flight plan is a function of the target environment and the intended mission. Designing of an optimal flight plan for autonomous aerial vehicles is a complex task and often requires co-ordination and data access from multiple subsystems involving multiple manual interventions and iterative modifications. Some prior systems involve first conducting a fly over of a survey target, whilst keeping a safe distance from the survey target. A flight plan for the fly over can be based on a two-dimensional navigation map and a manual indication of a location of the survey target. During the fly over, the aerial vehicle may image the survey target, which can be used in planning a subsequent flight plan that may allow a more detailed, and closer, survey of the target.

Accordingly, an objective of the present disclosure is to provide systems and methods for generating a flight plan to completely survey a structure or feature of interest without requiring an initial fly over of the structure or feature of interest, yet still allowing a detailed, and close-up, survey. It may additionally be desirable to provide systems and methods that allow even more complete surveys of survey targets in a resource efficient manner and from a remote flight planning system. Furthermore, other desirable features and characteristics of the disclosure will become apparent from the subsequent detailed description and the appended claims, taken in conjunction with the accompanying drawings and this background of the disclosure.

BRIEF SUMMARY

Systems and methods are provided for flight planning for an autonomous aerial vehicle. The systems and methods perform a processor executed process of receiving a request for flight planning and retrieving a model for the structure or the feature of interest from one or more databases. The request identifies a structure or a feature of interest to be surveyed by the autonomous aerial vehicle. The one or more databases include a database including models of terrain, airports and obstacles or a database including models of manufactured articles based on original equipment manufacturer (OEM) specifications or computer aided design (CAD) models. The process includes computing a flight plan that completely surveys the structure or completely surveys the feature of interest based on the retrieved model. The flight plan defines a search pattern with position values. The process includes uplinking the flight plan to the autonomous aerial vehicle.

This summary is provided to describe selected concepts in a simplified form that are further described in the Detailed Description. This summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
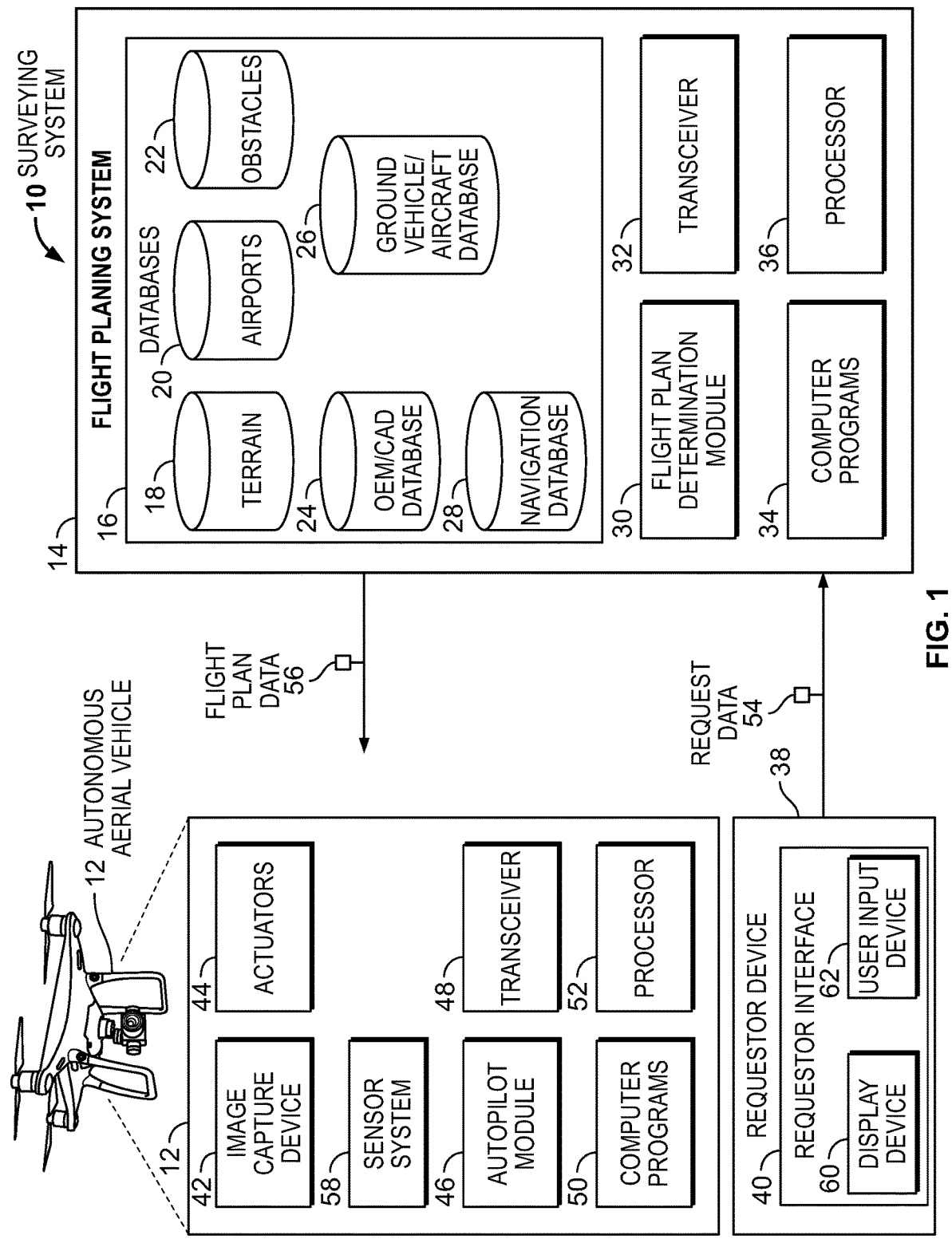
FIG. 1 is a schematic diagram of a system for surveying a structure or feature of interest, in accordance with an embodiment of the present disclosure.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

The present disclosure provides systems and methods for automated flight planning for special missions of search or inspection of three dimensional (3D) structures. The systems and methods described herein use precision obstacle databases or spatial data models of structures that are to be inspected. Depending on the fixed or non-stationary nature of the inspection elements, a flight plan is computed for the specific mission that may contain relative or absolute position and altitude/elevation values. The herein disclosed systems and methods enhance dispatcher productivity and save on operational costs involving special inspection missions in highly complex environments. Flight plans computed on the basis of 3D spatial modelling of inspection structures or precision 3D obstacle databases ensure that the inspection mission is thorough, complete and operationally optimal.

The systems and methods described herein propose flight planning for autonomous aerial vehicles (or unmanned aerial vehicles (UAVs)) involving inspection or search and rescue.

The flight plans are computed based on three dimensional (3D) spatial models of the objects, structures or features being inspected and may be provided as an application or service that dispatchers may use. A description of the specific search or inspection mission is received by a flight planning system. The system will retrieve the 3D spatial model corresponding to the object, structure or feature being inspected from a precision terrain and obstacle database or from an original equipment manufacturer (OEM) or other equipment manufacturer specifications of the specific structure being inspected. If the structure to be inspected is static or immovable like a bridge or a house (for example), the systems and methods will compute a mission flight plan as a series of absolute position values with associated altitude or elevation. If the structure to be inspected is non-fixed or a movable object like an aircraft or ground vehicle (for example), relative position values may be calculated. If inspection or search of non-fixed structure is performed when the same is moving (i.e. not stationary or parked), the relative position values must be adapted based on predicted position of the survey target based on movement of the survey target.

Having summarized the systems and methods for surveying a structure, object or other feature of interest, a more detailed description is provided in the following with respect to FIGS. 1 to 5. FIG. 1 depicts an exemplary embodiment of a surveying system 10 for generating a flight plan for surveying a structure, feature or object of interest and uplinking the flight plan to an autonomous aerial vehicle 12. The surveying system 10 includes an autonomous aerial vehicle 12, a flight planning system 14 and a requestor device 38. It should be understood that FIG. 1 is a simplified representation of the surveying system 10, and FIG. 1 is not intended to limit the application or scope of the subject matter in any way. In practice, the flight planning system 14 and/or the autonomous aerial vehicle 12 and/or the requestor device 38 will include numerous other devices and components for providing additional functions and features, as will be appreciated in the art.

The autonomous aerial vehicle 12 can be a multicopter (or rotary-wing), fixed-wing or a tilt-wing aircraft. In some embodiments, the autonomous aerial vehicle 12 is one that can hover, take off, and land vertically (a vertical take-off and landing vehicle (VTOL). VTOL aircraft can include a variety of types of aircraft including fixed-wing aircraft as well as helicopters and other aircraft with powered rotors, such as cyclogyros/cyclocopters and tiltrotors. The autonomous aerial vehicle 12 is an unmanned aerial vehicle (UAV) that can fly without the onboard presence of a pilot. The autonomous aerial vehicle 12 can be controlled by onboard electronic equipment or via control equipment from the ground or a combination of both. The autonomous aerial vehicle 12 may be an electric or hybrid-electric vehicle or may be otherwise powered. In embodiments, the autonomous aerial vehicle 12 is a rotorcraft.

The surveying system 10 includes one or more processors 36, 52 as part of the autonomous aerial vehicle 12, the flight planning system 14 and/or the requestor device 38 and associated computer programs 34, 50 stored on memory (not shown). The one or more processors 36, 52 are configured to execute computer programming instructions stored on non-transitory memory (not shown) and embodied in the computer programs 34, 50. Functions of the surveying system 10 and steps of the method 500 (FIG. 5) are carried out by one or more of the processors 36, 52 executing the associated computer programming instructions of the computer programs 34, 50. The modules, processes and functions described herein can be implemented by any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The modules 30, 46 are defined in the computer programs 34, 50 and are executable by the processors 36, 52 to carry out the described functions and steps. The modules 34, 50 are illustrated separately from the computer programs 40 purely for the purposes of illustration when they would, in reality, be embodied in the computer programs 34, 50.

The autonomous aerial vehicle 12 includes an image capture device 42, in some embodiments. The image capture device 42 can be a camera for taking two dimensional still images or video, in some embodiments. In other embodiments, the image capture device 42 is any of a range of three-dimensional (3D) image capture devices such as a stereo camera, a camera equipped with range finding capabilities (e.g. radar), a lidar camera, etc. In embodiments, the image capture device 12 is controlled by the processor 52 executing programming instructions to perform 3D scanning on the survey target to collect data on its shape, its location and possibly its appearance (e.g. color).

In embodiments, the autonomous aerial vehicle 12 includes a sensor system 58 for determining a variety of aircraft parameters. The sensor system 58 includes multiple sensors and receivers for determining detailed position information for the autonomous aerial vehicle 12 including absolute location and attitude of the autonomous aerial vehicle 12. When the image capture device 42 is movable, the sensor system 58 provides camera parameters including camera pose relative to the autonomous aerial vehicle 12. The location and attitude information for the autonomous aerial vehicle 12 and any sensed camera parameters and any other relevant aircraft parameters (such as speed) are combined with each captured image from the image capture device 42 to allow precise geospatial data to be collected for the survey target. In one embodiment, the sensor system 58 includes a Global Positioning System (GPS) or global navigation satellite system (GNSS) receiver and is configured to determine location of the autonomous aerial vehicle 12 based on global position data obtained from satellites, e.g. by trilateration with three or more satellites. In some embodiments, the sensor system 58 is configured to determine aircraft location based on Wide Area Augmentation System (WAAS) or other augmented satellite-based global position data. A network of ground-based reference stations provides measurements of small variations in the GPS satellites' signals so that onboard GPS or GNSS receivers use the corrections while computing their positions to improve accuracy of location data. The sensor system 58 includes sensors distributed throughout the autonomous aerial vehicle 12 to provide other aircraft data.

In embodiments, the autonomous aerial vehicle 12 includes an autopilot module 46 that determines control commands for actuators 12 of the autonomous aerial vehicle 12 to fly a flight plan embodied in flight plan data 56 received from the flight planning system 14. The autopilot module 46 receives various input aircraft parameters including location information, attitude information and speed information from the sensor system 58 in order to precisely follow the flight plan, particularly to follow a portion of the flight plan defining the survey of the survey target. The actuators 12 include actuators for adjusting throttle, steering and braking using various motors. The autopilot module 46 may implement one of a known kind of fly by wire systems that are able to follow a determined flight plan.

The autonomous aerial vehicle 12 includes a transceiver 48 for receiving, via a wireless communication channel, the flight plan data 56. In embodiments, the flight plan data 56 is provided to the autonomous aerial vehicle 12 from a remote computing device (e.g. the flight planning system 14 or the requestor device 38). The flight plan data 56 is uplinked from the flight planning system 14 or the requestor device 38 via ground based wireless transmitters, airborne wireless transmitters (e.g. another aircraft) or from satellite transmitters. The wireless communication channel may include radiofrequency or microwave communications. The wireless communication channel may include router based communications or cellular data communications. Uplinking of the flight plan data 56 may be performed over the internet or by any data communication network operated by various data services providers like SITA, ARINC, etc.

The requestor device 38 is any computing device that generates request data 54 describing the object, structure or feature to be surveyed. The requestor device 38 is in communication with the flight planning system 14 over a wired or wireless communications network. The requestor device 38 communicates with the flight planning system 14 over the internet in some embodiments. In embodiments, the requestor device has access to precision mapping databases such as the databases 16 described below with respect to the flight planning system 14. The requestor device 38 includes a requestor interface including a display device 60 and a user input device 62. In embodiments, the requestor device 38 (e.g. via a processor and computer programming instructions (not shown)) generates a precision map based on the databases 16 which can be navigated by a user by manipulation of the user input device 62. The user input device 62 can be controlled by a user to select a survey target from the precision map presented on the display device 60. The requestor device 38 thus generates request data 54 describing the survey target and sends the request data 54 to the flight planning system 14. In some embodiments, the requestor device 38 receives the flight plan data 56 from the flight planning system 14 and transmits (uplinks) the flight plan data 56 to the autonomous aerial vehicle 12. In embodiments, the requestor device 38 receives the geospatial survey data (including imaging data from the image capture device 42) from the autonomous aerial vehicle 12 and stores it in memory (not shown). Although a (human) user oriented requestor device 38 is illustrated in FIG. 1, the request data 54 can be received from other types of systems such as autonomously generated survey request data 54.

The flight planning system 14 includes databases 16 including at least one of the following databases: a terrain database 18, an airports database 20, an obstacles database 22, an original equipment manufacturer (OEM) and/or computer aided design (CAD) database 24, a ground vehicle and/or aircraft database 26 and a navigation database 28. The terrain database 18, the airports database 20 and the obstacles database 22 are shown separately in FIG. 1, but may be combined into a single terrain and obstacles database that also includes detailed information on airports. In one embodiment, at least one of the databases 16 is included as part of an enhanced ground and proximity warning system (EGPWS).

The databases 16 may include Honeywell's EGPWS Terrain and Obstacle Database, which covers 100 percent of the Earth's terrain in high-resolution data with more than 12,000 airports, 30,000 runways, and 108,000 obstacles providing certainty for continuous protection during aircraft takeoff, climb, cruise, descent, and landing, and in case of rapid descent where emergency flight planning is required. The integrity of the Terrain Database is ensured by continuously cross-mapping the terrain data with that of governments, geographical organizations, corporations, and private surveyors on every continent and inside each country to give pilots the most comprehensive, verified, and precise view. Data is validated by route structure analysis, in which engineers fly "virtual" aircraft into airports to analyze the performance of EGPWS and ensure the accuracy of terrain, runways, and surrounding obstacles. The Terrain and Obstacle database may incorporate worldwide precision 3D obstacle data to aid helicopter and UAV low flying operations.

In embodiments, the terrain database 18 is provided as part of an EGPWS. This database 18 may be aggregated from various sources supplying geographic and physical terrain data. Terrain data may have a resolution of up to 1 or 3 arc seconds. However, much higher precision databases may be provided. A precision obstacle and terrain Database may augment the terrain database 18 with very high resolution obstacle information aggregated from multiple techniques including LIDAR and Computer Vision Techniques, etc. and provide sub centimeter level. On similar lines, the airports database 20 (AMDB) precisely capture the airport mapping in 3D and sub centimeter resolution allowing for enhanced terminal area situational awareness and autonomous terminal area navigation of airplanes and autonomous vehicles. As such, the flight planning system 14 utilizes, in various embodiments, precision databases from which models (e.g. mesh models) of aircraft, structures and terrain can be retrieved to define optimal mission plans.

The databases 16 may include Honeywell's Airport Mapping Database (AMDB), which is a very accurate, standardized and periodically maintained 3D mapping of thousands of airports worldwide. The Airport Mapping Database currently drives onboard Synthetic View cockpit displays systems like Airport Moving Maps and also D-Taxi applications. The AMDB includes airport structures and surfaces. Additionally, the AMDB includes 3D spatial models of aircraft and surface vehicles operating at the airports. The AMDB includes runways, taxiways, hangers, terminals and other features like paint markings on runways, taxiways and other strategic locations at an airport. The AMDB database includes aircraft CAD models and specifications, which can be used for synthesizing 3D spatial models of aircraft.

In embodiments, the databases 16 include one or more sources of 3D volumetric models (e.g. 3D CAD models/mesh models for aircraft, objects/equipment, structures and other features of interest). In some embodiments, the 3D models are generated using system specifications of equipment or surface mapping standards included in one or more of the obstacles database 22, the OEM/CAD database 24, the ground vehicle/aircraft database 26, the airports database 20 and the terrain database 18. In some embodiments, the 3D volumetric models are embodied as polygon mesh models or wireframes. The 3D volumetric models may be generated from the databases 16 and used in flight planning irrespective of the geo location of the survey target by using relative positions to perform mission planning. By using 3D volumetric models, the survey can be planned to include top surfaces, side surfaces and underside surfaces of the survey target.

In embodiments, the databases 16 include three-dimensional (3D) spatial data describing shape, dimensions, and location of aircraft, ground vehicles, buildings and other man-made structures (e.g. bridges, transport structures, communications towers, etc.) and any structure, obstacle, object or feature that may require surveying. The 3D data may be concerned with survey targets within an airport environment and outside airport environments. In some embodiments, the databases 16 are used in combination. For example, the navigation database 28 or the terrain database 18 or the obstacle database 22 may identify location of a type of survey target (e.g. an aircraft) and the OEM/CAD database can be accessed based on the type of survey target to obtain a model of the survey target for use in flight planning. Many combinations of databases 16 can be envisaged for obtaining the requisite model data.

The flight planning system 14 includes a flight plan determination module 30. The flight plan determination module 30 is configured, by processor 36 executing computer programs 34, to compute a flight plan that completely surveys a survey target based on a model (e.g. a 3D volumetric model such as a mesh model or a wireframe model) retrieved from any one or more of the databases 16. In embodiments, the flight plan determination module 30 retrieves survey parameters from memory (not shown) such as separation distance to be maintained from the survey target and a coverage width. The coverage width represents a distance that the autonomous aerial vehicle 12 can survey at the separation distance, which may be related to a field of view of the autonomous aerial vehicle 12. The flight plan determination module 30 is configured to analyze the model of the survey target with respect to the survey parameters to determine an optimal flight plan that completely surveys the survey target. In embodiments, the flight plan determination module 30 is configured to compute the flight plan to take into account a number of factors including one or any combination of minimizing climbs and descents, minimizing energy consumption, maintaining the separation distance of the autonomous aerial vehicle 12 and the survey target, fitting of predetermined types of search patterns to the model of the survey target, and maximizing coverage of the survey target. In some embodiments, many flight plans may be generated by the flight plan determination module 30 and each flight plan simulated for the autonomous aerial vehicle 12 based on the model to ensure complete coverage of the survey target. When more than one effective flight plan is found, the flight plan may be selected based on minimizing distance covered (which may be proportional to measurement of energy consumption).

The flight plan may be determined with absolute geodetic values or with relative values, as will be described in greater detail below. When the flight plan is determined using relative values based on the 3D model, these relative values are converted to absolute values by the flight plan determination module 30 based on an absolute location of the survey target in the real world, which may be information identified in the request data 54 or may be subsequently obtained information. The absolute location of the survey target may be more precisely determined using one or more of the databases 16. For example, the request data 54 may identify a survey target at a particular location. The 3D model of the target may be obtained from the OEM/CAD database 24 (for example) to allow the relative flight plan to be determined. The location of the survey target may be coarsely identified in the request data 54, which can be known more precisely from the obstacles database 22. Once the precise location of the survey target is known, the relative values of the flight plan can be added to the absolute location of the survey target to determine the flight plan, which comprises position values. As described in further detail below, the absolute location of the survey target may be a dynamic variable when the survey target is moving. The dynamic information may be obtained from reported location data from the survey target, which can be accessed by the flight planning system 14.

In some embodiments, the flight plan determination module 30 executes an optimization problem to generate the flight plan data 56. A target parameter for the optimization may be time, distance, number of turns, number of return-to-base refueling operations or any combination of such target parameters. With multiple waypoints at a safe separation distance from the survey target, an optimized flight plan, or an optimized combination of multiple flight plans that cover the complete area of the survey target, is derived applying optimization techniques. Considering the range of the autonomous aerial vehicle 12, it is possible that the autonomous aerial vehicle 12 may be required to return to a specified base for refueling or recharging operations. In effect, an optimal mission may therefore be a combination of plural smaller flight plans with different start and end points requiring plural takeoffs and landings or plural autonomous aerial vehicles 12. The flight planning logic will, in some embodiments, also consider the prevailing performance and dynamic range of the autonomous aerial vehicle 12 effected by the estimated or prevailing environmental conditions of wind, temperature and pressure, etc.

In some embodiments, the flight plan determination module 30 accesses a database (not shown) of standard mission patterns, which may be adapted, scaled and combined in order to fit the 3D spatial model. Depending on the size and shape of the scan area, the flight plan determination module 30 will select and scale and possibly combine standard scan patterns to generate an optimal flight plan that is unlinked to the autonomous aerial vehicle 12 executing the mission. Some example search patterns include the sector pattern, the expanding square pattern, the creeping ladder pattern, the parallel ladder pattern, etc. The absolute or relative position values included in the flight plan data 56 track direction change points.

The flight planning system 14 uplinks the flight plan determined by the flight plan determination module 30 to the autonomous aerial vehicle 12 (or the requestor device 38) by sending the flight plan data 56 via the transceiver 32. The transceiver 32 uplinks the flight plan data 56 wirelessly in some embodiments. The transceiver 32 may operate through radio frequency and/or microwave communications channels. The transceiver 32 may communicate with the autonomous aerial vehicle 12 over the internet through router based channels and/or over cellular networks. In some embodiments, the flight plan data 56 is sent to the requestor device 38, which sends the flight plan data to the autonomous aerial vehicle 12.

In embodiments, the flight plan determination module 30 determines a plurality of coordinated flight plans, one for each of a plurality of autonomous aerial vehicles 12. The flight plan determination module 30 may divide a completely determined flight plan into more than one part for a respective autonomous aerial vehicle 12. In other embodiments, the flight plan determination module 30 may take into account different survey parameters for different autonomous aerial vehicles 12 in determining the flight plan such that a coordinated flight plan is determined that factors in different surveying capabilities of each autonomous aerial vehicle 12. The flight planning system 14 uplinks respective parts of a coordinated flight plan to respective intended autonomous aerial vehicles 12.

In embodiments, the flight planning system 14 first sends (via the transceiver 32) the flight plan data 56 to Air Traffic Control (ATC) for approval before unlinking the flight plan data 56 to the autonomous aerial vehicle 12 (or vehicles).

Figure 2:
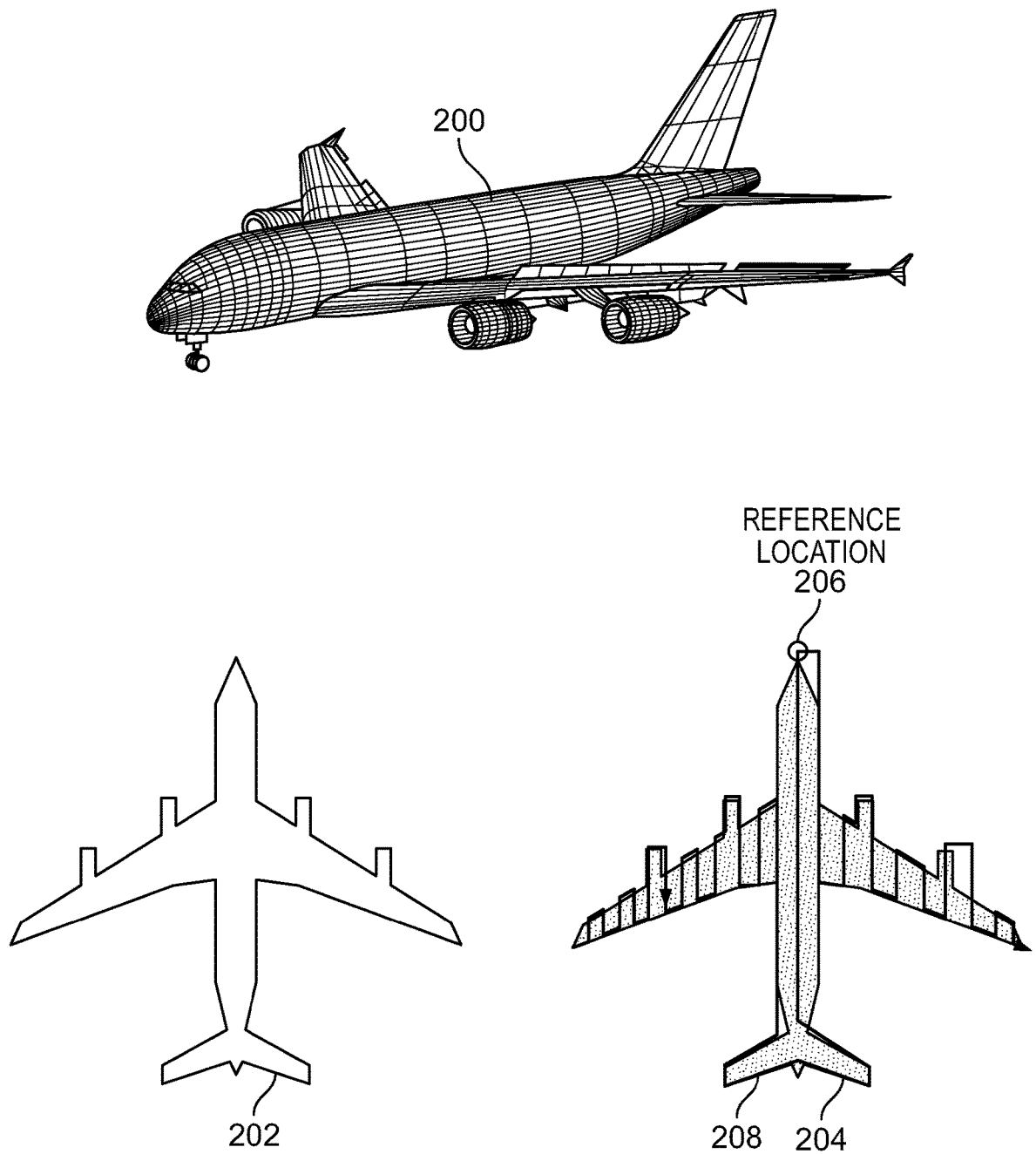
FIG. 2 is a data flow diagram representing processes executed by the surveying system of FIG. 1, in accordance with an embodiment of the present disclosure.

An exemplary use of the surveying system 10 of FIG. 1 will be described with reference to FIG. 2, in accordance with an exemplary embodiment. In the embodiment of FIG. 2, a mission requirement for performing the inspection or scan of an aircraft (e.g. an Airbus A380) is entered by a user of the requestor device 38. It should be appreciated that an aircraft is provided purely by way of an example use. The survey request can be for any machinery, structure, object or feature of interest. The present example is concerned with a movable survey target. The requestor device 38 embodies a location of the aircraft and identifies the aircraft type by model number in the request data 54.

The flight planning system 14 receives the request data 54 and accesses one or more of the databases 16 to retrieve a 3D spatial model of the aircraft. In the present embodiment, the ground vehicle/aircraft database 26 or the OEM/CAD database 24 is accessed to obtain the 3D spatial model of the aircraft. The 3D spatial model in the database may be built based on OEM specifications or derived from imaging techniques (Cameras, surface RADAR systems, etc.). An illustration 200 of the retrieved 3D model of the aircraft is shown. The flight plan determination module 30 generates a flight plan to completely survey the aircraft whilst maintaining a safe tolerance of the autonomous aerial vehicle 12 from the aircraft, as defined by the separation distance included in the survey parameters. The flight plan determination module 30 determines an outer boundary of the aircraft based on the 3D spatial model to define a boundary for flight planning. Illustration 202 shows the defined boundary of the 3D spatial model.

The flight plan determination module 30 determines that the aircraft is a movable structure based on different classes of survey targets being known to the flight planning system 14. As shown in the illustration 204, the flight plan determination module 30 further defines a reference location 206 on the 3D spatial model (because the survey target is a movable target) and defines the flight plan data 56 (embodying the illustrated flight plan 208) to include position values relative to the reference location 206. The relative position values will include latitude, longitude and altitude (or elevation). The height part of the position values is optional in some embodiments. The flight plan 208 including relative position values may be converted to absolute position and height values just prior to initiation of the survey based on current location of the aircraft received from the requester device 38 or obtained by the flight planning system 14 from the aircraft or from another source of the current location. The absolute values thus obtained are included into the flight plan data 56 and unlinked to the autonomous aerial vehicle 12 for executing the survey. The autonomous aerial vehicle 12 flies the flight plan according to the flight plan data 56 by operation of the autopilot module 46 as described above. Further, the autonomous aerial vehicle 12 carries out the scan using the image capture device 42.

Figure 3:
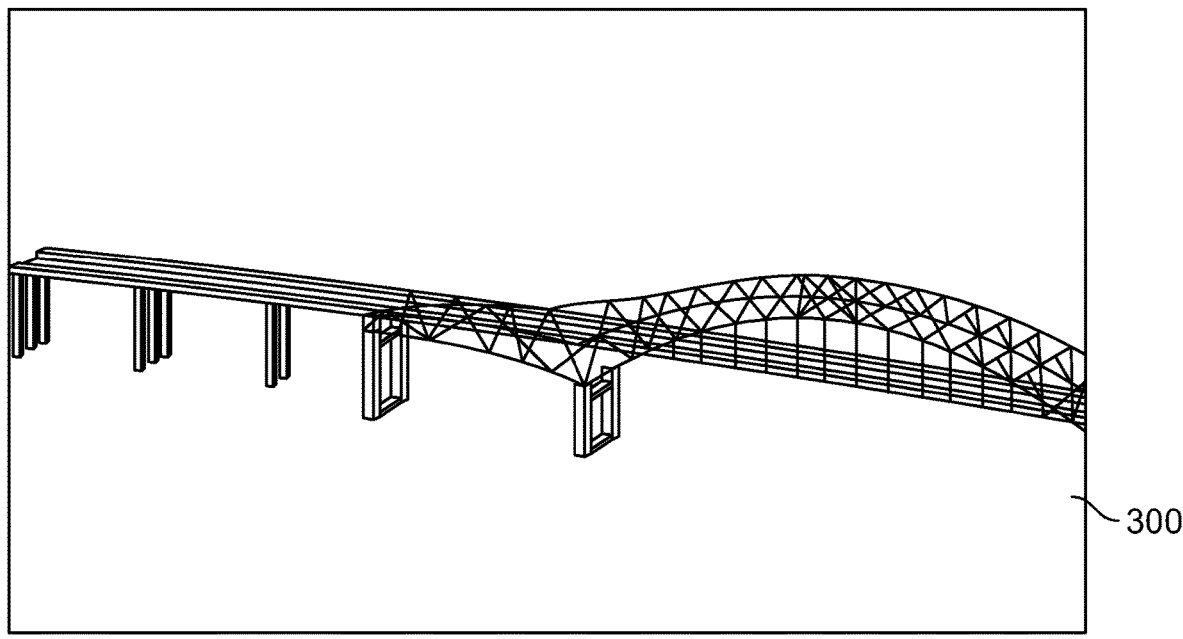
FIG. 3 is a data flow diagram representing processes executed by the surveying system of FIG. 1, in accordance with an embodiment of the present disclosure.
Figure 3:
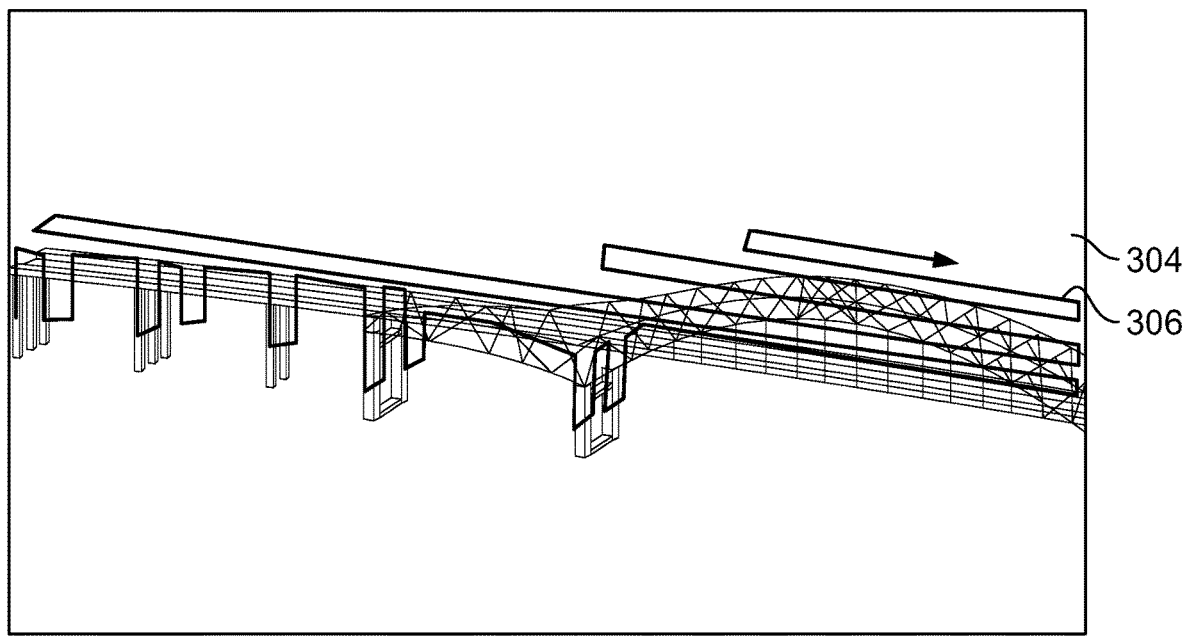

Another exemplary use of the surveying system 10 of FIG. 1 will be described with reference to FIG. 3, in accordance with an exemplary embodiment. In the embodiment of FIG. 3, a survey requirement for performing the inspection or scan of a bridge structure is entered by a user of the requestor device 38. It should be appreciated that a bridge structure is provided purely by way of an example use. The survey request can be for any machinery, structure, object or feature of interest. The present example is concerned with a static survey target.

The flight plan determination module 30 receives an identification of the survey target in the request data 54. Based on the request data 54, the flight plan determination module 30 retrieves a 3D spatial model of the bridge structure from the precision terrain and obstacles database (corresponding to combined terrain and obstacles databases 18, 22). The 3D spatial model 300 of the bridge is partially illustrated in FIG. 3. The flight plan determination module 30 determines that the bridge structure is fixed based on memory storage of classes of survey targets or based on a corresponding field in the request data 54. The flight plan determination module 30 determines an optimal survey pattern for the 3D model, which maximizes coverage of the bridge and which may factor in minimizing climbs and descents and/or energy consumption. In embodiments, the flight plan determination module 30 generates many flight plan alternatives and scores each alternative based on factors such as coverage and energy consumption and selects the flight plan that achieves the optimal score. The flight plan determination module 30 devises the flight plan 306 in 3D space as a series of geodetic position values with an associated altitude or height at each position, as illustrated by 304 in FIG. 3. Since the bridge structure is fixed and immovable, the position values used in the flight plan are absolute. The flight plan is embodied in flight plan data 56 and uplinked to the autonomous aerial vehicle 12 for mission execution.

Figure 4:
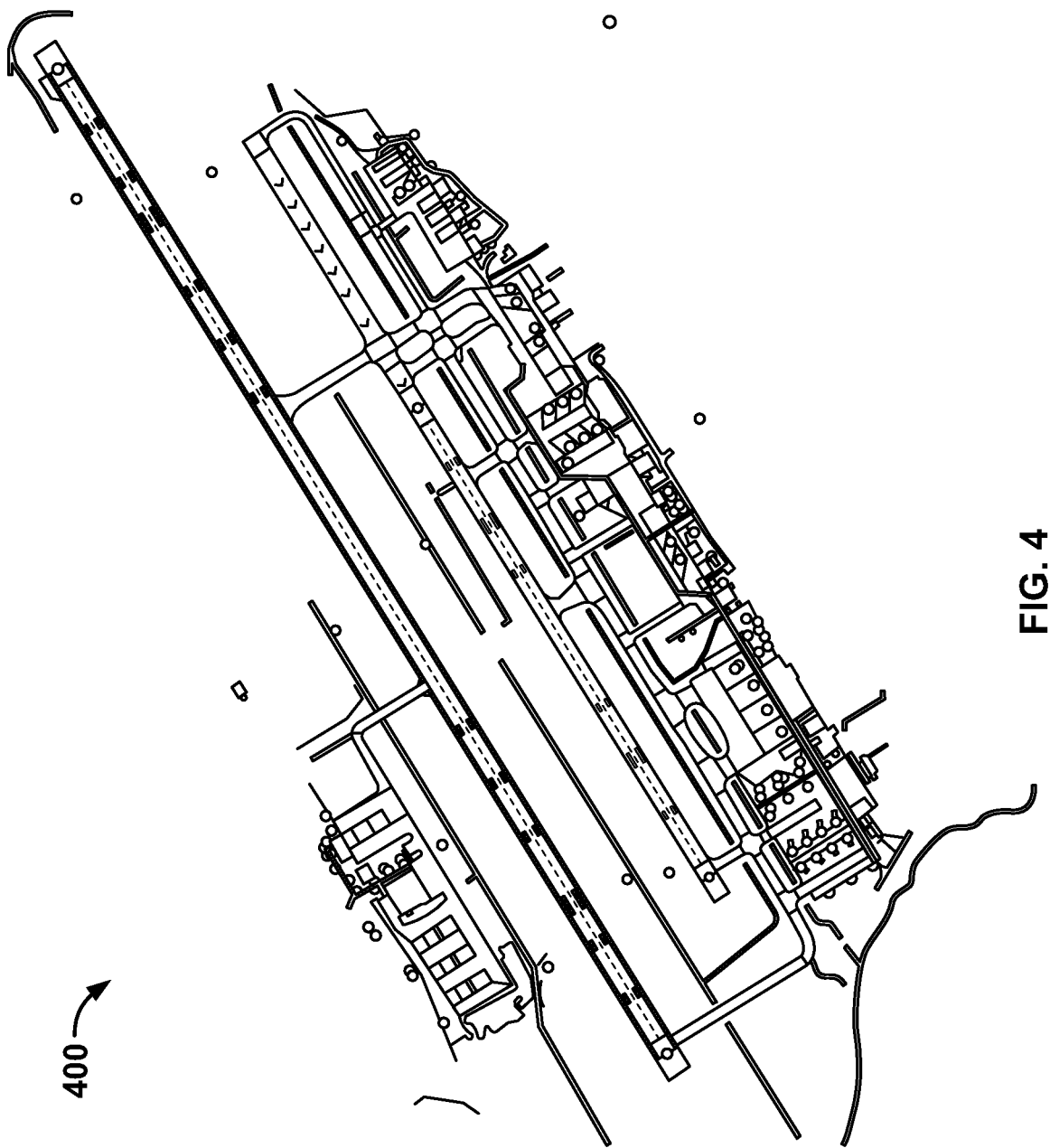
FIG. 4 is an example of airport mapping data used by the system of FIG. 1, in accordance with an embodiment of the present disclosure.

Yet another exemplary use of the surveying system 10 of FIG. 1 will be described with reference to FIG. 4, in accordance with an exemplary embodiment. In the embodiment of FIG. 4, a survey requirement is received, through request data 54, for inspection or surveillance of aerodrome surfaces. The flight plan determination module 30 interrogates the airports database 20 (also referred to as AMDB herein), which has precision mapping data for every structure at aerodromes across the world. The request data 54 identifies a particular aerodrome for surveying. The AMDB data includes 3D spatial models of various structures at the identified aerodrome. An exemplary aerodrome model is shown by 400 in FIG. 4. The flight plan determination module 30 determines an optimal flight plan for the complete airport (or selected regions or structures at the airport as defined by the request data 54). The flight plan determination module 30 outputs flight plan data 56, which is uplinked to the autonomous aerial vehicle 12. The autonomous aerial vehicle 12 executes the surveying mission based on the flight plan data 56.

The survey system 10 of FIG. 1 allows remotely generated flight plans based on synthesized models (3D spatial and 2D feature maps) without requiring an intensive area survey using cameras and drones to be performed prior to generating the flight plan. The use of 3D spatial models allows highly accurate, energy efficient and safe flight plans to be performed by autonomous aerial vehicles, which includes undersides of various structures.

Figure 5:
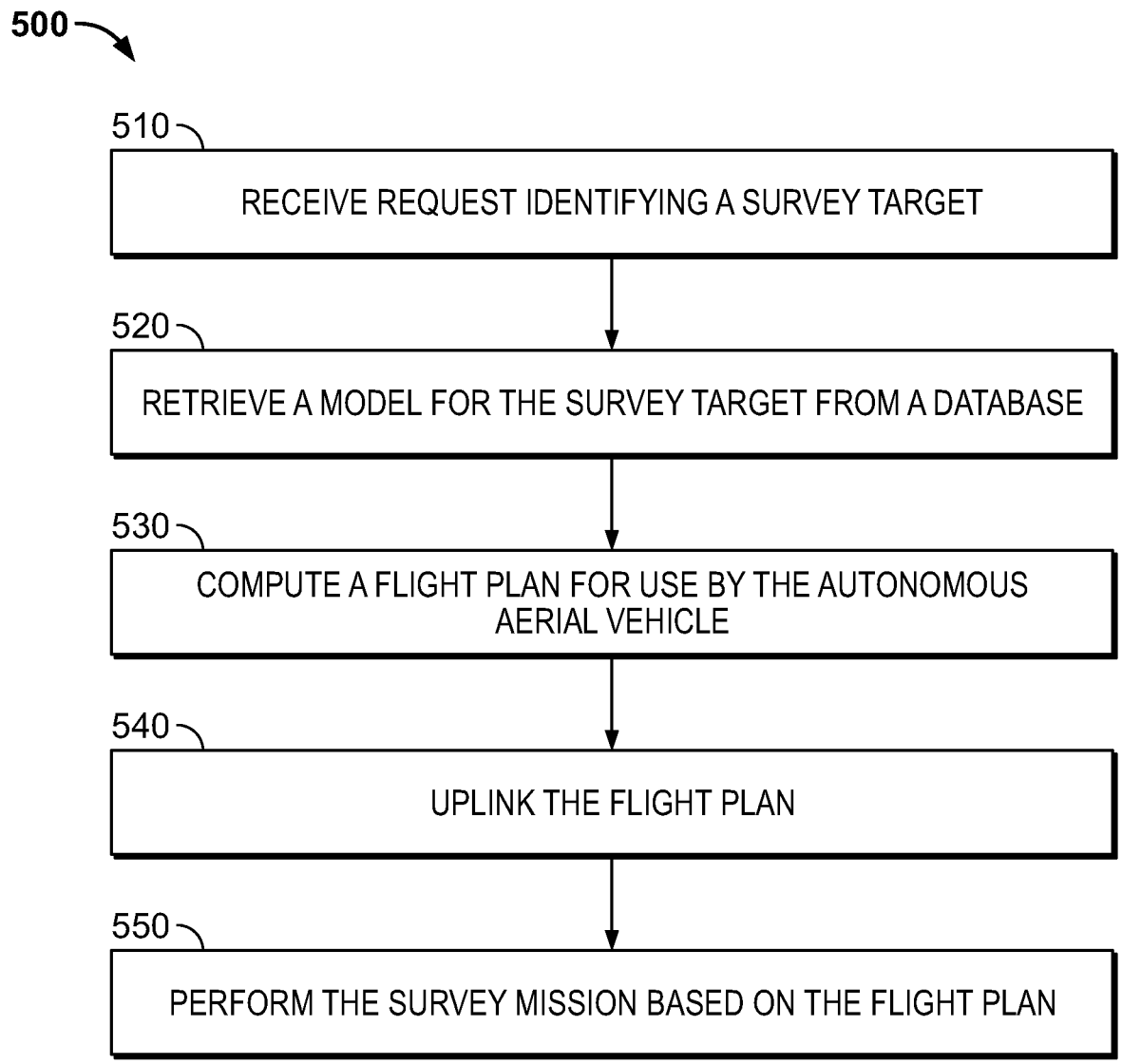
FIG. 5 is a flowchart of a method for surveying a structure or feature of interest, in accordance with an embodiment of the present disclosure.

FIG. 5 is a flowchart illustrating an exemplary method 500 for flight planning for an autonomous aerial vehicle 12 to survey a survey target, in accordance with various embodiments. Steps of method 500 are performed by the processor 36 of the flight planning system 14 (FIG. 1) executing computer programming instructions of computer programs 34. Method 500 operates in response to receipt of a request from the requestor device 38. The request is received by the flight planning system in step 510. The request includes request data 54, which identifies a survey target (e.g. an object, a machine, a structure or some other feature of interest) including a location of the survey target.

Method 500 includes step 520 of retrieving, via the flight plan determination module 30, a model for the survey target from one or more of the databases 16. In embodiments, the model is a 3D volumetric model, which may be in the form of a wireframe or polygon mesh model or may be converted to that format by the flight plan determination module 30.

Method 500 includes step 530 of computing a flight plan for use by the autonomous aerial vehicle 12 based on the model. The flight plan is determined based on survey parameters, which may include inherent scanning parameters of the autonomous aerial vehicle 12 (e.g. scanning dimensions) and a minimum separation distance from the survey target. Step 540 may include running a flight plan determination algorithm that maximizes coverage of the survey target and minimizes various parameters such as energy consumption and climbs and descents. In some embodiments, step 530 includes adapting (e.g. scaling and shaping) standard search and rescue scan patterns retrieved from a database of known scan patterns. In embodiments, the method 500 includes determining whether the survey target is movable or fixed. When fixed, absolute position values may be determined based on the model (and its world location). When movable, the flight plan determination module may first determine relative position values, which are converted to absolute position values based on an updated (or continually updated or even predicted) current location of the survey target when the autonomous aerial vehicle 12 is in position ready to commence the survey. The flight plan determined by the flight planning system 14 is embodied in the flight plan data 56.

Method 500 includes step 540 of uplinking the flight plan data 56. In some embodiments, the flight plan data 56 is first cleared by air traffic control. The flight plan data 56 may be uplinked directly to the autonomous aerial vehicle 12 or sent indirectly via the requestor device 38. In method step 550, the autonomous aerial vehicle 12 performs the survey mission based on the flight plan data 56. That is, the autonomous aerial vehicle 12 tracks the flight plan defined in the flight plan data 56 by operation of the autopilot module 46 sending commands to the actuators 44. The autonomous aerial vehicle 12 operates the image capture device 42 during the flight in order conduct the survey.

Embodiments of the surveying system 10 have been described in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The use cases and the depictions provided here are only exemplary in nature. It should be possible to use different symbology and semantics to accomplish the same concepts described herein.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

The invention claimed is:

1. A system for flight planning for an autonomous aerial vehicle to survey a survey target, wherein the survey target is an aircraft, the system comprising:
    the autonomous vehicle, the autonomous vehicle having an image capture device mounted thereto for imaging the survey target as part of the complete survey, wherein the image capture device is configured to capture image data in three dimensions;
    a database including models of manufactured articles based on original equipment manufacturer (OEM) specifications or computer aided design (CAD) models, wherein the database including models of manufactured articles is an aircraft database;
    at least one processor configured to execute program instructions, wherein the program instructions are configured to cause the at least one processor to:
        receive a request for flight planning, the request identifying a survey target for the autonomous aerial vehicle;
        retrieve at least one model for the survey target from the database, wherein the at least one model includes a wireframe model or a polygon mesh;

compute a flight plan that completely surveys the survey target based on the retrieved at least one model, wherein the flight plan defines a search pattern with position values including computing the flight plan with relative position values that are defined relative to a reference location on the survey target, receiving a current location of the survey target, and converting the relative position values to absolute geodetic position values using the current location, wherein the flight plan includes top surfaces, side surfaces and underside surfaces of the survey target, wherein the flight plan is computed to take into account a number of factors including one or any combination of:

minimizing climbs and descents;

minimizing energy consumption;

maintaining a tolerance separation distance of the autonomous aerial vehicle and the survey target;

fitting of predetermined types of search patterns to the at least one model of the survey target;

minimizing return to base operations for refueling or battery replacement; and maximizing coverage of the at least one model of the survey target; and uplink the flight plan to the autonomous aerial vehicle including the absolute geodetic position values.

2. The system of claim 1, wherein the position values include lateral, longitudinal and altitude values.

3. The system of claim 1, wherein the program instructions are configured to:

cause the at least one processor to compute a plurality of coordinated flight plans that together completely survey the survey target based on the at least one model; and uplink each of the plurality of flight plans to a respective autonomous aerial vehicle.

4. The system of claim 1, wherein the program instructions are configured to:

cause the at least one processor to request approval for the flight plan from an air traffic controller; and uplink the flight plan to the autonomous aerial vehicle in dependence on receiving approval from the air traffic controller.

5. The system of claim 1, wherein the at least one model is a three-dimensional model.

6. A method of flight planning for an autonomous aerial vehicle to survey a survey target, wherein the survey target is an aircraft, the method comprising:

receiving, by at least one processor of a flight planning system, a request for flight planning, the request identifying the survey target for the autonomous aerial vehicle;

retrieving, by the at least one processor, at least one model for the survey target from a database, wherein the at least one model includes a wireframe model or a polygon mesh and wherein the database includes a database including models of manufactured articles based on original equipment manufacturer (OEM) specifications or computer aided design (CAD) models, wherein the database including models of manufactured articles is an aircraft database;

computing, by the at least one processor, a flight plan that completely surveys the survey target based on the retrieved at least one model, wherein the flight plan defines a search pattern with position values including computing the flight plan with relative position values that are defined relative to a reference location on the survey target, receiving a current location of the survey target, and converting the relative position values to absolute geodetic position values using the current location, wherein the flight plan includes top surfaces, side surfaces and underside surfaces of the survey target, wherein the flight plan is computed to take into account a number of factors including one or any combination of:

minimizing climbs and descents;

minimizing energy consumption;

maintaining a tolerance separation distance of the autonomous aerial vehicle and the survey target;

fitting of predetermined types of search patterns to the at least one model of the survey target;

minimizing return to base operations for refueling or battery replacement; and maximizing coverage of the at least one model of the survey target;

uplinking, by the at least one processor, the flight plan to the autonomous aerial vehicle including the absolute geodetic position values; and the autonomous aerial vehicle surveying the survey target based on the uplinked flight plan, wherein the autonomous vehicle has an image capture device mounted thereto for capturing image data in three dimensions, the further method comprising:

three dimensional imaging of the survey target as part of the complete survey.

7. The method of claim 6, wherein the position values include lateral, longitudinal and altitude values.

8. The method of claim 6, comprising:

causing, by the at least one processor, the at least one processor to compute a plurality of coordinated flight plans that together completely survey the survey target based on the at least one model; and uplinking, by the at least one processor, each of the plurality of flight plans to a respective autonomous aerial vehicle.

9. The method of claim 6, wherein the at least one model is a three-dimensional model.

* * * * *